(12) United States Patent
Nagayama et al.

(10) Patent No.: US 9,259,869 B2
(45) Date of Patent: Feb. 16, 2016

(54) TWO-COLOR MOLDED ARTICLE AND PROCESS FOR PRODUCTION THEREOF

(75) Inventors: Tomoaki Nagayama, Yokohama (JP); Ryuhei Nishida, Yokohama (JP); Yasuhiro Kon, Sagamihara (JP); Yoshiyuki Tada, Sagamihara (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 847 days.

(21) Appl. No.: 13/577,150

(22) PCT Filed: Feb. 2, 2011

(86) PCT No.: PCT/JP2011/052169
§ 371 (c)(1),
(2), (4) Date: Sep. 6, 2012

(87) PCT Pub. No.: WO2011/096443
PCT Pub. Date: Aug. 11, 2011

(65) Prior Publication Data
US 2013/0004725 A1    Jan. 3, 2013

(30) Foreign Application Priority Data
Feb. 4, 2010   (JP) ................................. 2010-022714

(51) Int. Cl.
| | |
|---|---|
| *B32B 3/00* | (2006.01) |
| *B28B 5/00* | (2006.01) |
| *B29C 39/12* | (2006.01) |
| *B29C 45/16* | (2006.01) |
| *B29C 45/36* | (2006.01) |

(52) U.S. Cl.
CPC ............. *B29C 45/16* (2013.01); *B29C 45/1635* (2013.01); *B29C 2045/1682* (2013.01); *B29C 2045/363* (2013.01); *Y10T 428/24612* (2015.01)

(58) Field of Classification Search
CPC .. B29C 45/16; B29C 45/1635; B29C 45/062; B29C 45/1615; B29C 45/572; B29C 2045/167; B29C 2045/363; Y10T 428/24612
USPC ............ 428/67, 156, 172; 264/245, 246, 255, 264/328.8
See application file for complete search history.

(56) References Cited

U.S. PATENT DOCUMENTS 5,567,362 A * 10/1996 Grun ...................... B29C 45/16
                                                                264/1.31
2003/0116886 A1    6/2003 Nakazawa

FOREIGN PATENT DOCUMENTS

| JP | 58-116139 A | 7/1983 |
|---|---|---|
| JP | 64-020109 A | 1/1989 |

* cited by examiner

*Primary Examiner* — Catherine A Simone
(74) *Attorney, Agent, or Firm* — Manabu Kanesaka

(57) ABSTRACT

A primary-side molded article includes a primary-side base part, a primary-side decorative raised part, an upright face, an intersecting face, a dead-end part on the primary-side base part at least surrounded by the upright face and intersecting face and positioned outside the primary-side decorative part, a secondary-side resin flow path formed in the dead-end part and running through the primary-side base part from a design face side to a bottom face side, and a protective wall projecting from the bottom face side of the primary-side base and surrounding a perimeter of the secondary-side resin flow path. A secondary-side molded article has a design face-side molded part, a bottom face-side molded part, and an interspersed molded part flowing through the secondary-side resin flow path from the design face side to the bottom face side and interspersed at a distance from the bottom face-side molded part with the protective wall in between.

10 Claims, 17 Drawing Sheets

TWO-COLOR MOLDED ARTICLE AND PROCESS FOR PRODUCTION THEREOF

TECHNOLOGICAL FIELD

This invention relates to a two-color molded article and a process for production thereof, in which a secondary-side resin flow path is formed on a perimeter of a primary-side decorative raised part being formed on a design face side of a primary-side molded article and configuring a character, figure, or other decorative part, the secondary-side resin flow path running through from the design face side to a bottom face side of the primary-side molded article, and a protective wall is formed on the bottom face side of the primary-side molded article, the protective wall surrounding a perimeter of the secondary-side resin flow path, whereby the production of gas burns or weld lines, which are produced during secondary side molding, can be prevented.

BACKGROUND TECHNOLOGY

There is hitherto known a two-color molding process for fabricating a key top having a closed region such as in the number "0" or the letter "B" or "P" (for example, see Patent Document 1, page 3, top right section, line 2, to same page, bottom right section, line 9, and FIGS. 1 and 2).

Connect-through holes are formed respectively on the inside and outside of the closed region on a primary-side molded article being molded by the abovementioned two-color molding process, the connect-through holes running through the primary-side molded article from top to bottom. A slide core is placed on the bottom face side of the primary-side molded article, and the slide core is retracted, whereby resin of the secondary-side molded article is filled inside a lower-side space part formed between the bottom face of the primary-side molded article and the slide core. The filled resin passes through the connect-through hole, and flows into the inside and outside of the closed region formed on the design face side of the primary-side molded article.

PRIOR ART DOCUMENTS

Patent Documents

Patent Document 1: Japanese Unexamined Patent Publication No. S64-20109

SUMMARY OF THE INVENTION

Problems to be Solved by the Invention

However, with the abovementioned prior two-color molding process, there is a problem that gas burns or weld lines are easily produced, because the resin of the secondary-side molded article is filled from the bottom face side into the closed region formed on the design face side of the primary-side molded article.

Therefore, the present invention has been created in consideration of the abovementioned problem of the prior art, and an object of the invention is to make it possible to prevent the production of gas burns or weld lines produced during secondary side molding.

Means for Solving the Problems

The present invention has been created in order to achieve the abovementioned object, and the two-color molded article according to the present invention is characterized by the following points.

Firstly, a two-color molded article has a perimeter of a primary-side molded article roughly covered by a secondary-side molded article.

Secondly, the primary-side molded article has the following configuration.

(1) Primary-side base part (2) Primary-side decorative raised part

The primary-side decorative raised part projects from a design face side of the primary-side base part and configures a character, figure, or other decorative part.

(3) Upright face

The upright face stands upright from the primary-side base part.

(4) Intersecting face

The intersecting face intersects with the upright face and stands upright from the primary-side base part.

(5) Dead-end part

The dead-end part is positioned on the primary-side base part, is at least surrounded by the upright face and the intersecting face, and is positioned outside of the primary-side decorative raised part.

(6) Secondary-side resin flow path

The secondary-side resin flow path is formed in the dead-end part and runs through the primary-side base part from the design face side to a bottom face side.

(7) Protective wall

The protective wall projects from the bottom face side of the primary-side base and surrounds a perimeter of the secondary-side resin flow path.

Thirdly, the secondary-side molded article has the following configuration.

(8) Design face-side molded part

The design face-side molded part is filled from the design face side of the primary side base part and covers the perimeter of the primary-side decorative raised part.

(9) Bottom face-side molded part

The bottom face-side molded part turns in toward the bottom face side from the design face side of the primary-side base part and covers the bottom face side of the primary-side base part.

(10) Interspersed molded part

The interspersed molded part flows through the secondary-side resin flow path from the design face side to the bottom face side, and is interspersed at a distance from the bottom face-side molded part with the protective wall in between.

The two-color molded article according to the present invention may be characterized also by the following point.

A volume of the design face-side molded part and a volume of the bottom face-side molded part are set to an equal volume ratio. Thus, the primary-side molded article is surrounded by the resin of the secondary-side molded article, and the volume of the design face-side molded part and the volume of the bottom face-side molded part are set to an equal volume ratio, whereby the forces of contraction of the resins can be brought into contention on the top and bottom of the two-color molded article, and the occurrence of warping can be cancelled out.

The two-color molded article according to the present invention may be characterized also by the following point.

The intersecting face intersects with the upright face at a right angle or at an acute angle.

Also, the two-color molded article according to the present invention may be characterized also by the following points.

Firstly, the intersecting face is positioned on both sides of the upright face.

Secondly, the dead-end part is surrounded on three sides.

Furthermore, the two-color molded article according to the present invention may be characterized also by the following point.

The secondary-side resin flow path faces either the upright face or the intersecting face.

Thus, the secondary-side resin flow path can be placed suitably on the dead-end part where gas burns or weld lines are easily produced.

The two-color molded article according to the present invention may be characterized also by the following point.

The protective wall is formed in a cylindrical shape.

Also, the two-color molded article according to the present invention may be characterized also by the following point.

The protective wall is formed by straddling two or more adjacent secondary-side resin flow paths.

Thus, the protective wall can be suitably formed.

The two-color molded article according to the present invention may be characterized also by the following points.

Firstly, the process is for production of a two-color molded article having a perimeter of a primary-side molded article roughly covered by a secondary-side molded article.

Secondly, the primary-side molded article is primarily molded.

Thirdly, the primary-side molded article has the following configuration.

(1) Primary-side base part (2) Primary-side decorative raised part

The primary-side decorative raised part projects from a design face side of the primary-side base part and configures a character, figure, or other decorative part.

(3) Upright face

The upright face stands upright from the primary-side base part.

(4) Intersecting face

The intersecting face intersects with the upright face and stands upright from the primary-side base part.

(5) Dead-end part

The dead-end part is positioned on the primary-side base part, is at least surrounded by the upright face and the intersecting face, and is positioned outside of the primary-side decorative raised part.

(6) Secondary-side resin flow path

The secondary-side resin flow path is formed in the dead-end part and runs through the primary-side base part from the design face side to a bottom face side.

(7) Protective wall

The protective wall projects from the bottom face side of the primary-side base and surrounds a perimeter of the secondary-side resin flow path.

Fourthly, the secondary-side molded article is secondarily molded.

Fifthly, the secondary-side molded article has the following configuration.

(8) Design face-side molded part

The design face-side molded part is filled from the design face side of the primary side base part and covers the perimeter of the primary-side decorative raised part.

(9) Bottom face-side molded part

The bottom face-side molded part turns in toward the bottom face side from the design face side of the primary-side base part and covers the bottom face side of the primary-side base part.

(10) Interspersed molded part

The interspersed molded part flows through the secondary-side resin flow path from the design face side to the bottom face side, and is interspersed at a distance from the bottom face-side molded part with the protective wall in between.

The two-color molded article according to the present invention may be characterized also by the following points.

Firstly, the movable-side die has a slide core to be inserted into the secondary-side resin flow path.

Secondly, the slide core is retracted during retraction of the movable-side die, whereby secondary molding resin filled from the design face side of the primary-side base part is allowed to flow to the bottom face side.

Also, the two-color molded article according to the present invention may be characterized also by the following points.

Firstly, the movable-side die has a slide core to be inserted into the secondary-side resin flow path.

Secondly, the slide core is retracted during retraction of the movable-side die, and the retracted slide core is brought to a stop inside the secondary-side resin flow path.

Effects of the Invention

According to the two-color molded article of the present invention, the production of gas burns or weld lines, which are produced during secondary side molding, can be prevented by forming the secondary-side resin flow path on the perimeter of the primary-side decorative raised part being formed on the design face side of the primary-side molded article and configuring a character, figure, or other decorative part, the secondary-side resin flow path running through from the design face side to a bottom face side of the primary-side molded article, and forming the protective wall on the bottom face side of the primary-side molded article, the protective wall surrounding the perimeter of the secondary-side resin flow path.

That is, during the secondary molding, the molten resin having been injected from the design face side of the primary-side base part and having turned in toward the bottom face side past the perimeter of the primary-side base part is blocked by the protective wall and does not intersect with the molten resin having been filled inside the protective wall through the secondary-side resin flow path.

Therefore, according to the two-color molded article of the present invention, the production of gas burns or weld lines, which are easily produced in the dead-end part of the primary-side decorative raised part, can be prevented in advance.

According to the process for production the two-color molded article according to the present invention, the production of gas burns or weld lines, which are produced during secondary side molding, can be prevented by forming the secondary-side resin flow path on the perimeter of the primary-side decorative raised part being formed on the design face side of the primary-side molded article and configuring a character, figure, or other decorative part, the secondary-side resin flow path running through from the design face side to a bottom face side of the primary-side molded article, and forming the protective wall on the bottom face side of the primary-side molded article, the protective wall surrounding the perimeter of the secondary-side resin flow path.

EMBODIMENTS OF THE PRESENT INVENTION

In FIGS. 2 to 7, "10" is a two-color molded article produced by the production process according to the present invention, and a decorative part 20 including the English letter "E" is formed on the top face thereof.

Although the decorative part 20 was illustrated as an English letter "E" as an example, the invention is not limited to this, and the decorative part may be another character, figure, symbol, or the like.

Figure 7:
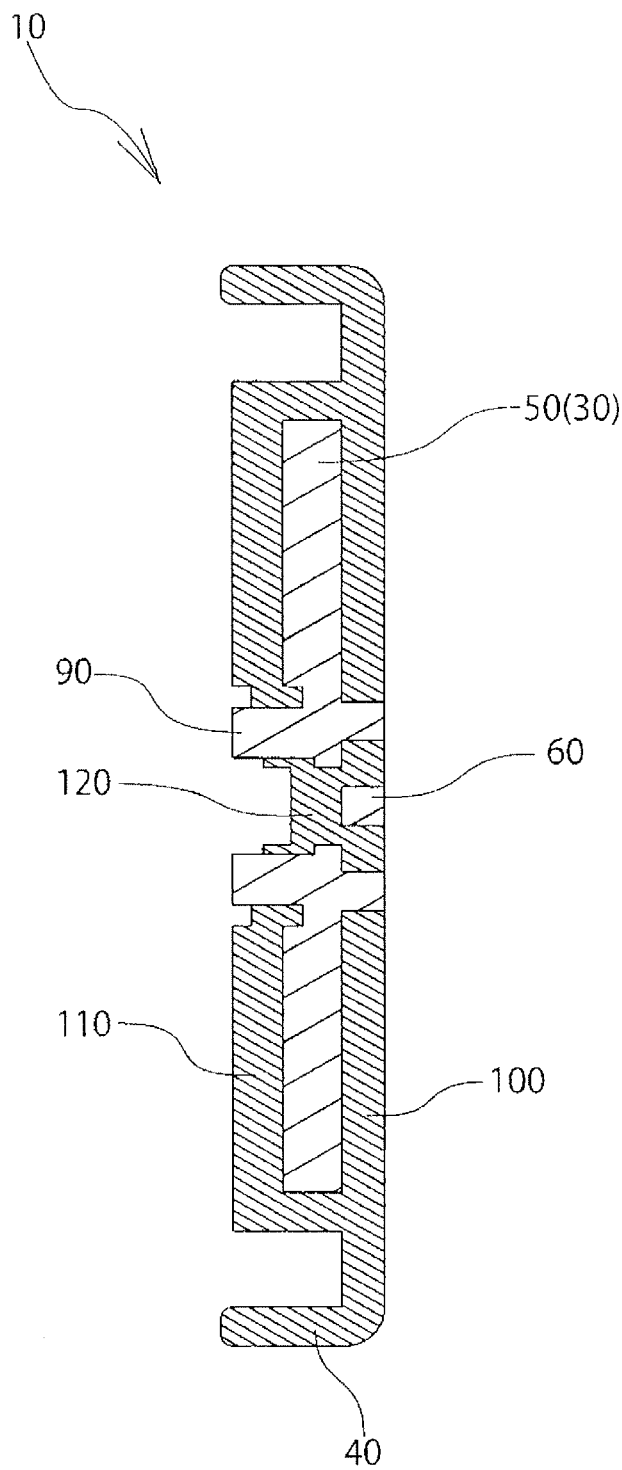
FIG. 7 is a sectional view taken along A-A line in FIG. 5.
Figure 8:
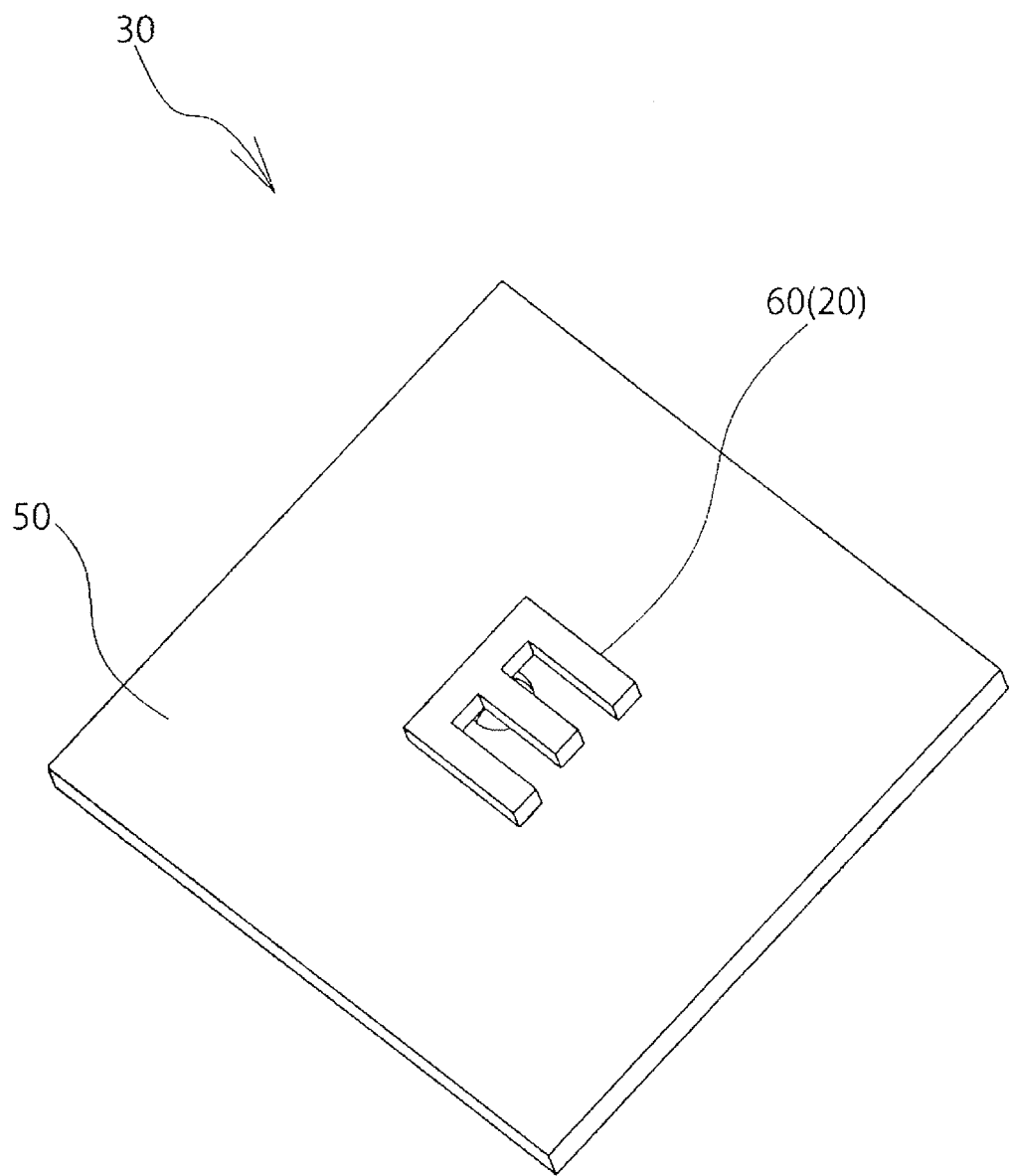
FIG. 8 is a perspective view viewed from the design face side of the primary-side molded article according to the first embodiment of the present invention.
Figure 9:
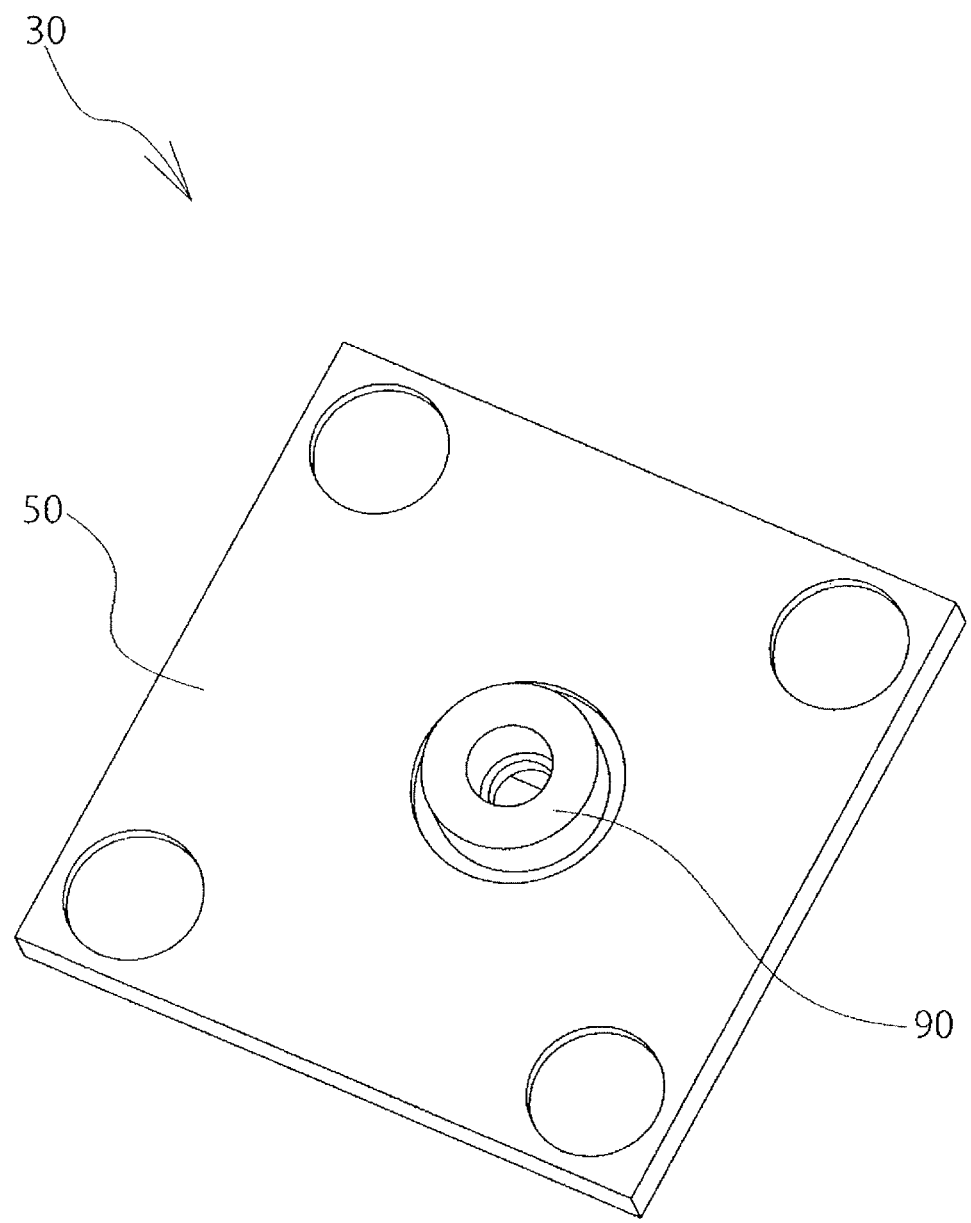
FIG. 9 is a perspective view viewed from the bottom face side of the primary-side molded article.
Figure 10:
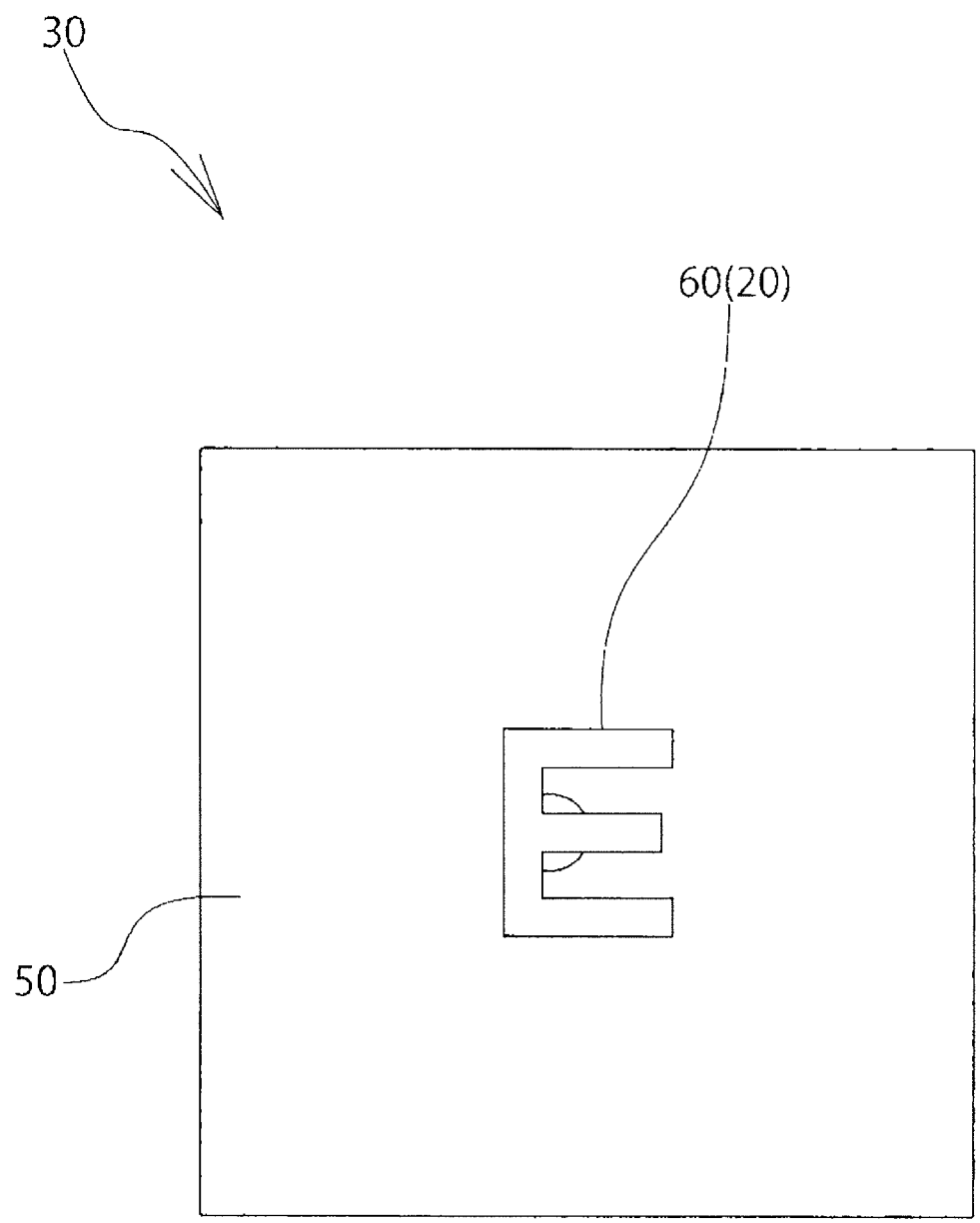
FIG. 10 is a plan view of the primary-side molded article.
Figure 11:
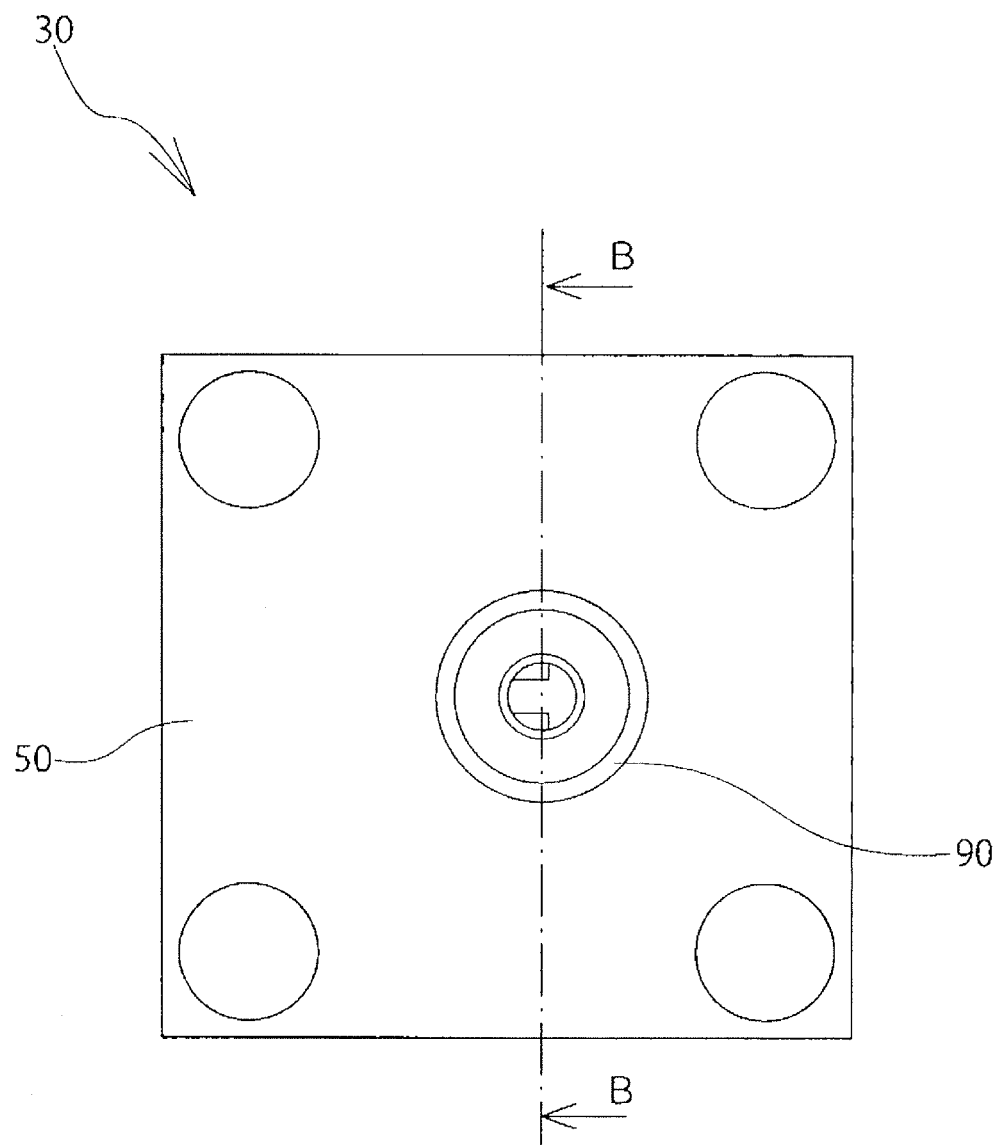
FIG. 11 is a bottom view of the primary-side molded article.
Figure 12:
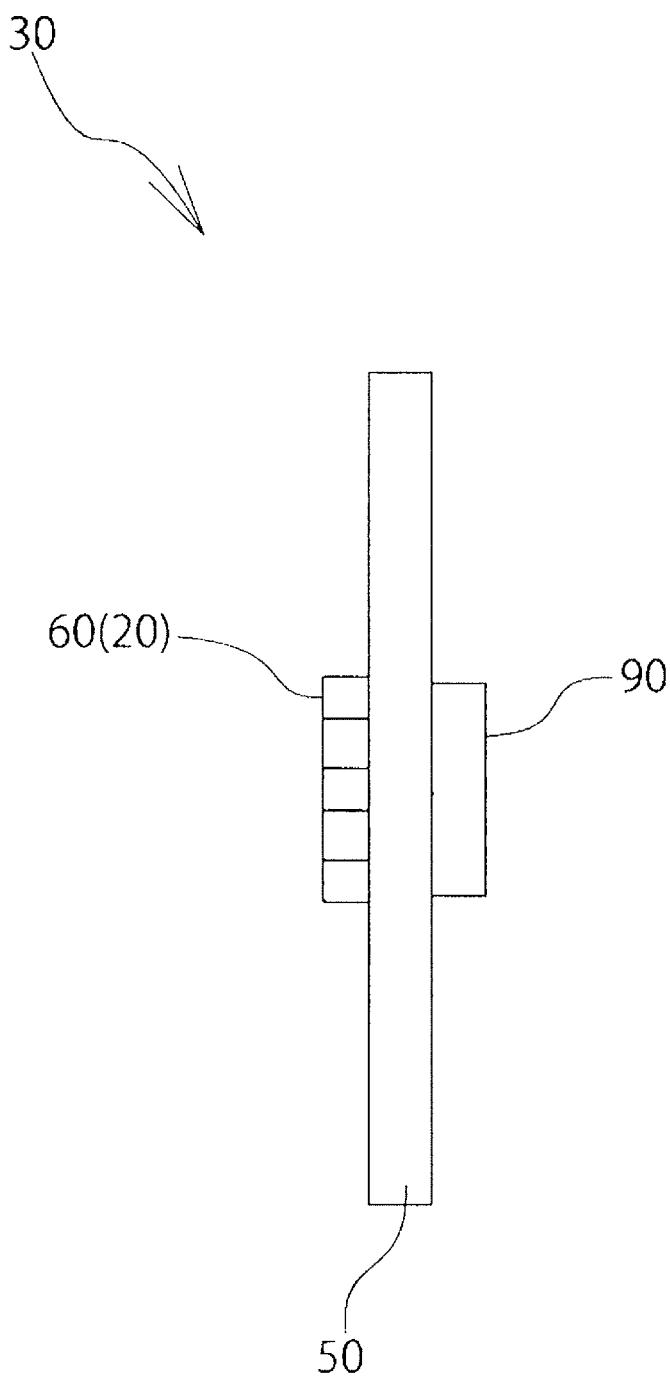
FIG. 12 is a side view of the primary-side molded article.
Figure 13:
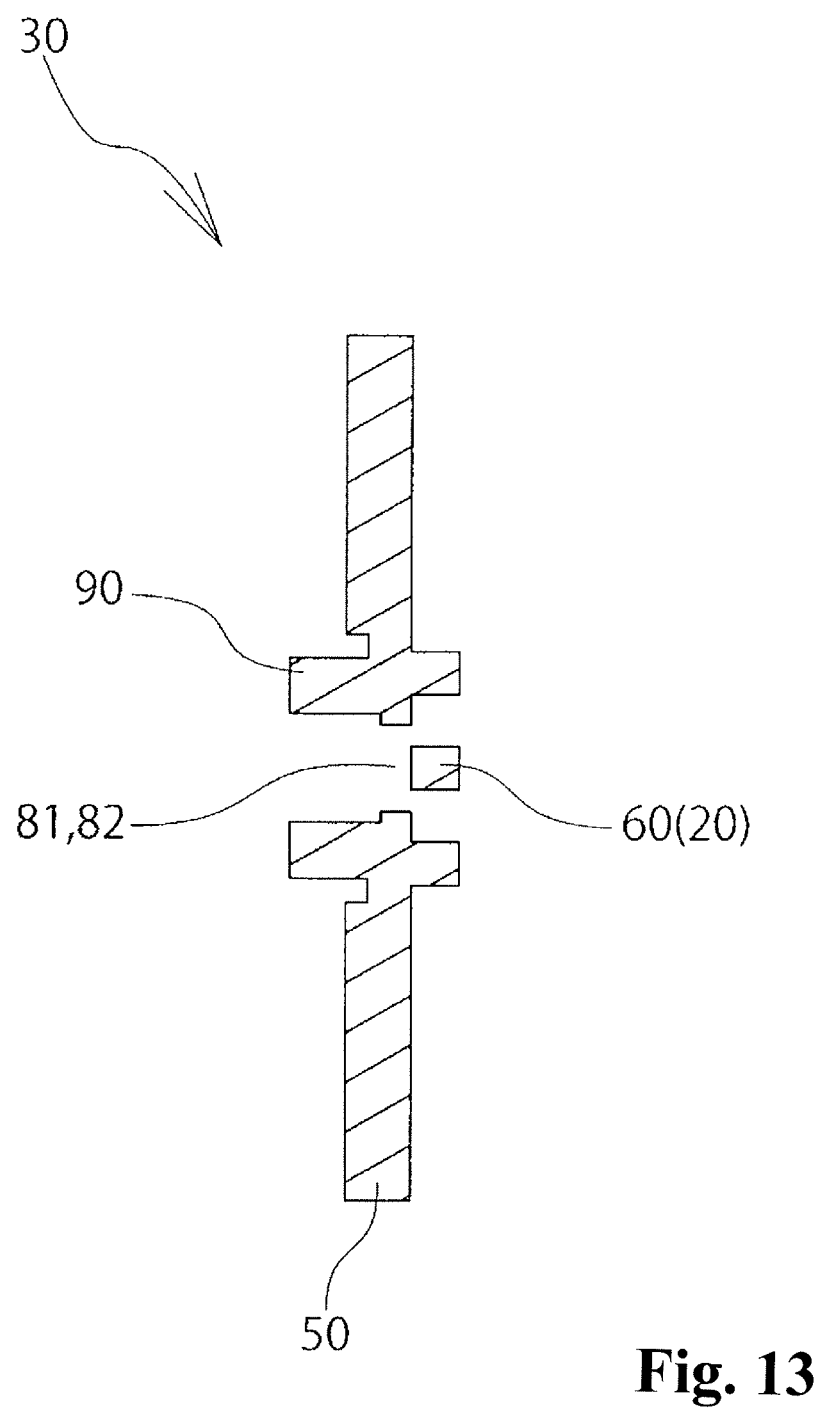
FIG. 13 is a sectional view along B-B line in FIG. 13.

The two-color molded article 10, broadly divided, is configured with the following parts, as illustrated in FIG. 7.

The following (1) and (2) are to be described.

(1) Primary-side molded article 30

(2) Secondary-side molded article 40

The parts of the two-color molded article 10 are not limited to the above (1) and (2), and two or more kinds of colors or resins may be used.

(Primary-Side Molded Article 30)

The primary-side molded article 30 is made by using ABS (Acrylonitrile butadiene styrene) or another thermoplastic resin having a suitable degree of rigidity.

Although the material for molding of the primary-side molded article 30 was illustrated as ABS as an example, the invention is not limited to this; for example, PP (polypropylene) may be used.

Specifically, the primary-side molded article 30, broadly divided, has the following parts, as illustrated in FIGS. 8 to 16.

The following (1) to (5) are to be described.

(1) Primary-side base part 50

(2) Primary-side decorative raised part 60

(3) Dead-end parts 70 and 71

(4) Secondary-side resin flow paths 80 and 81

(5) Protective wall 90

The parts of the primary-side molded article 30 are not limited to the above (1) to (5).

(Secondary-Side Molded Article 40)

The secondary-side molded article 40 is as follows:

Specifically, the secondary-side molded article 40 may have the following parts, as illustrated in FIGS. 2 to 7.

(1) Design face-side molded part 100

The design face-side molded part 100 is filled from the design face side of the primary-side base part 50 and covers the perimeter of the primary-side decorative raised part 60, as illustrated in FIGS. 1, 3, 5, 6, and 7.

Figure 1:
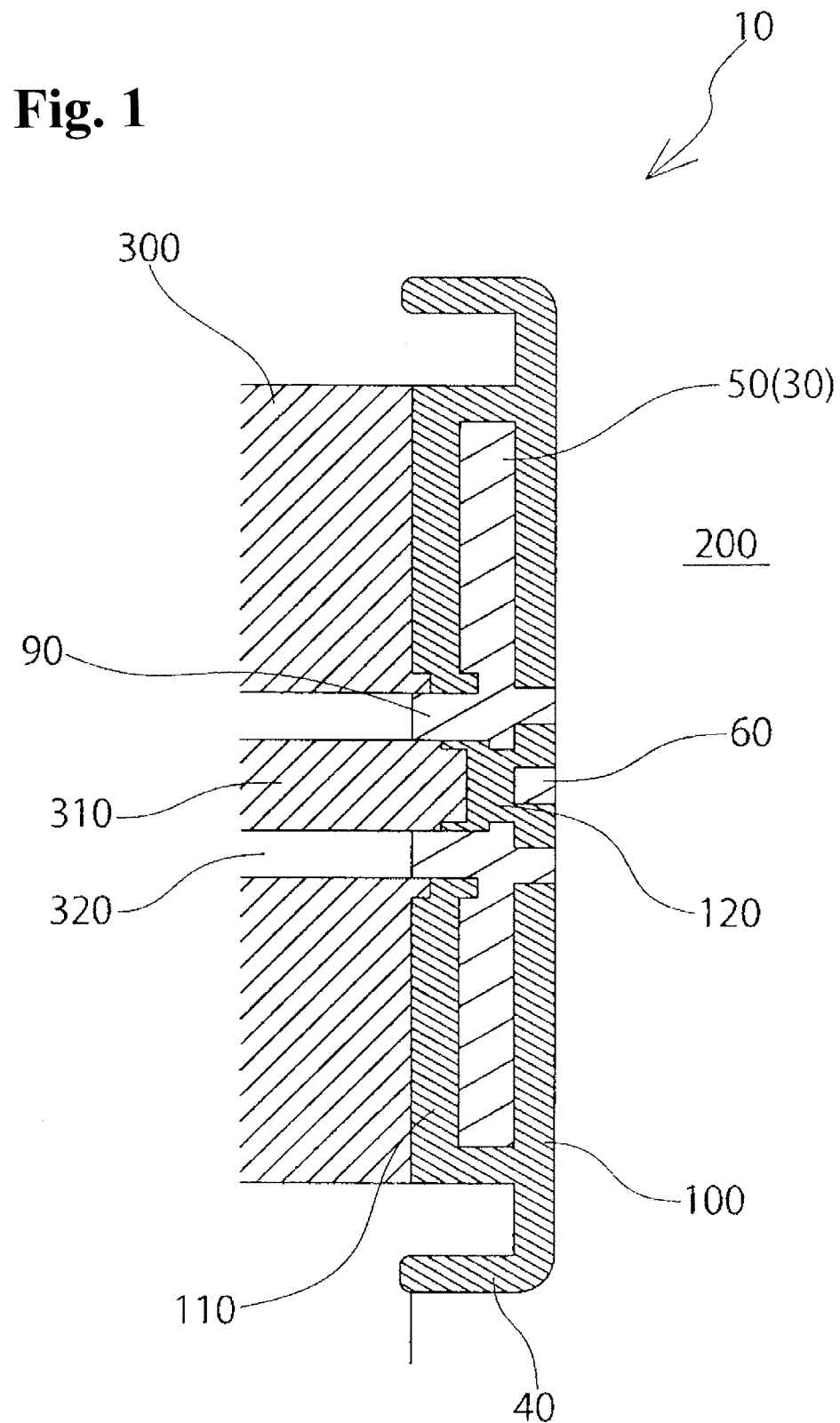
FIG. 1 is a schematic longitudinal sectional view of a dice during secondary molding according to the first embodiment of the present invention.
Figure 2:
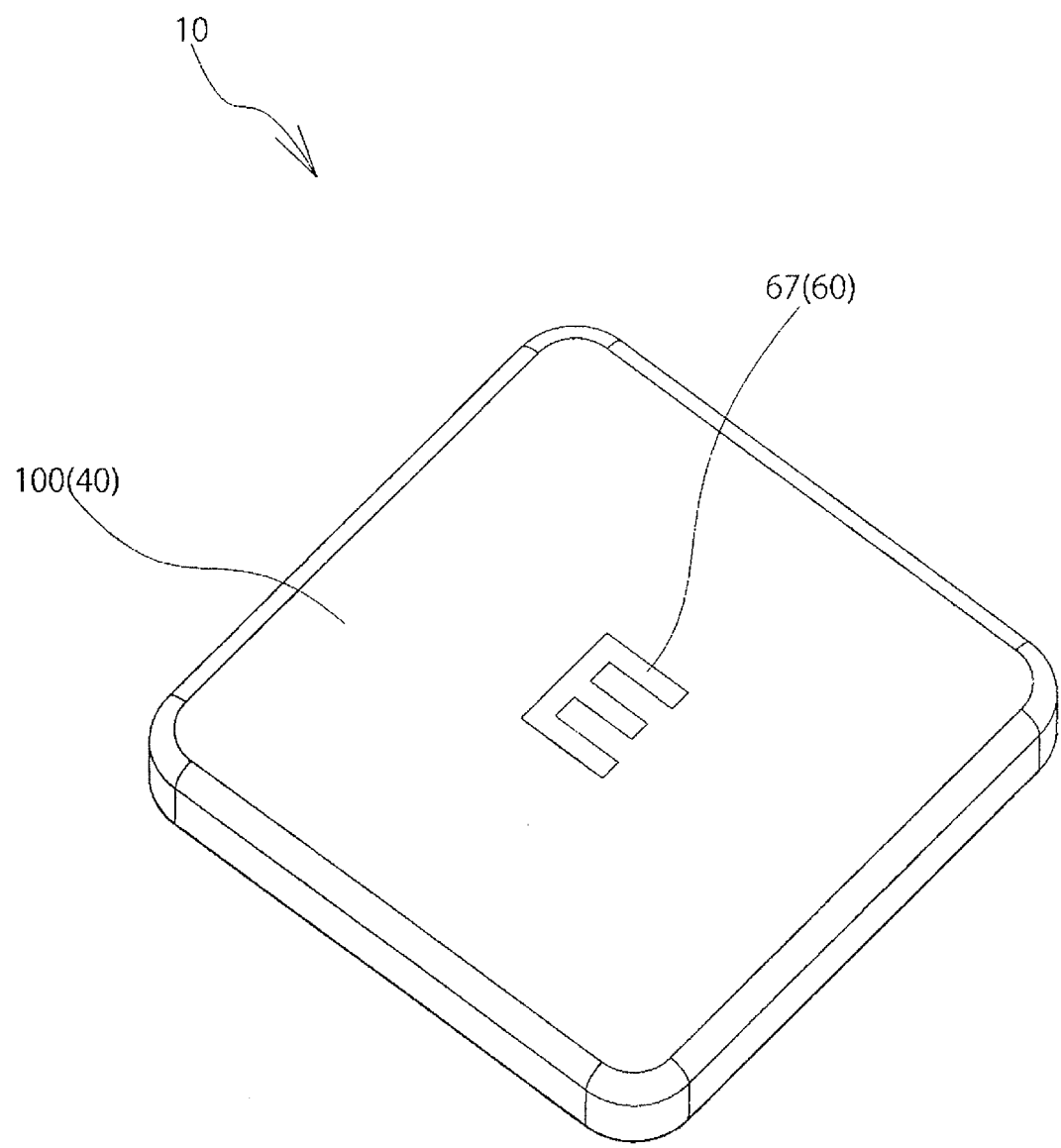
FIG. 2 is a perspective view viewed from the design face side of the two-color molded article according to the first embodiment of the present invention.
Figure 3:
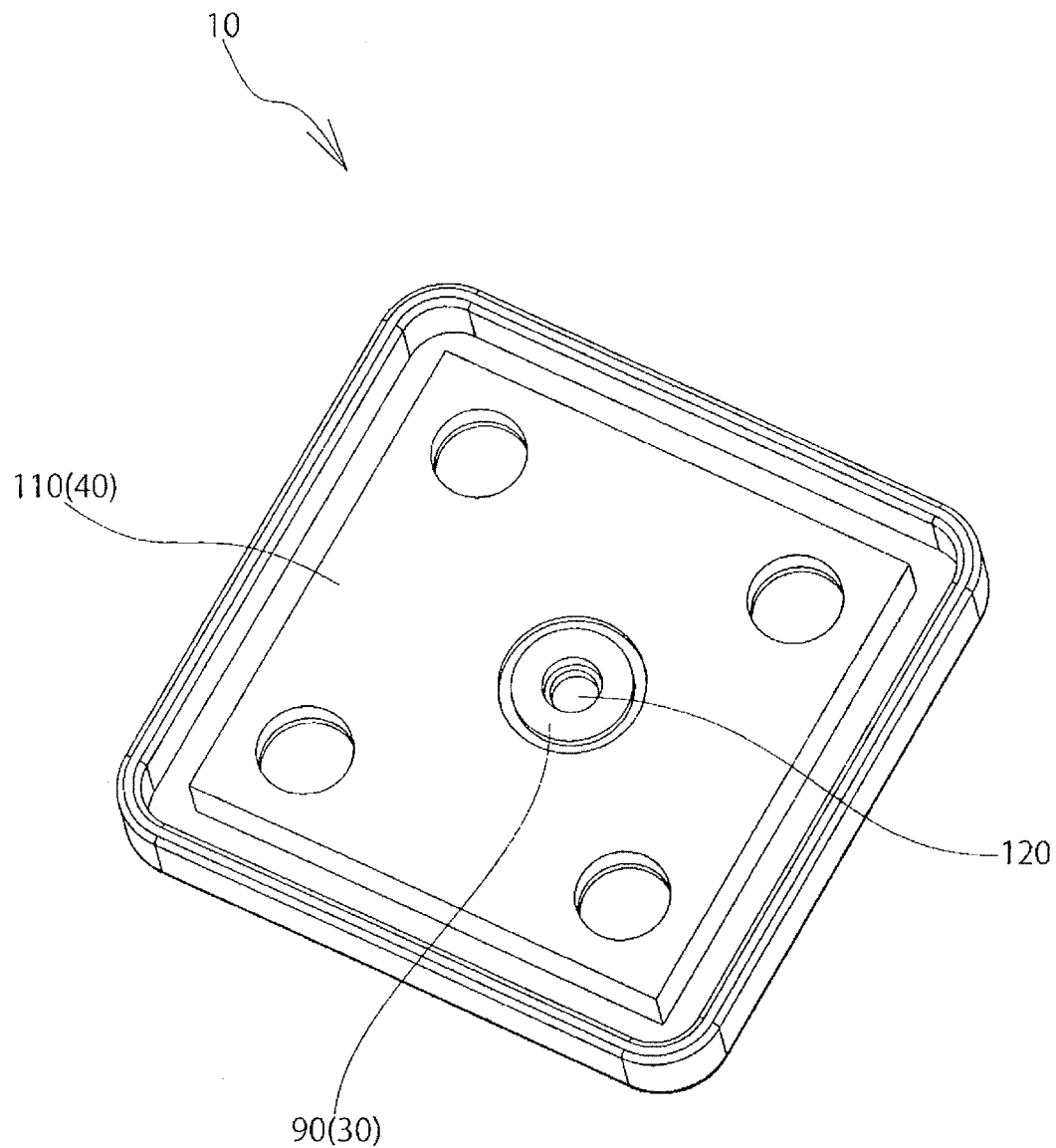
FIG. 3 is a perspective view viewed from the bottom face side of the two-color molded article.
Figure 4:
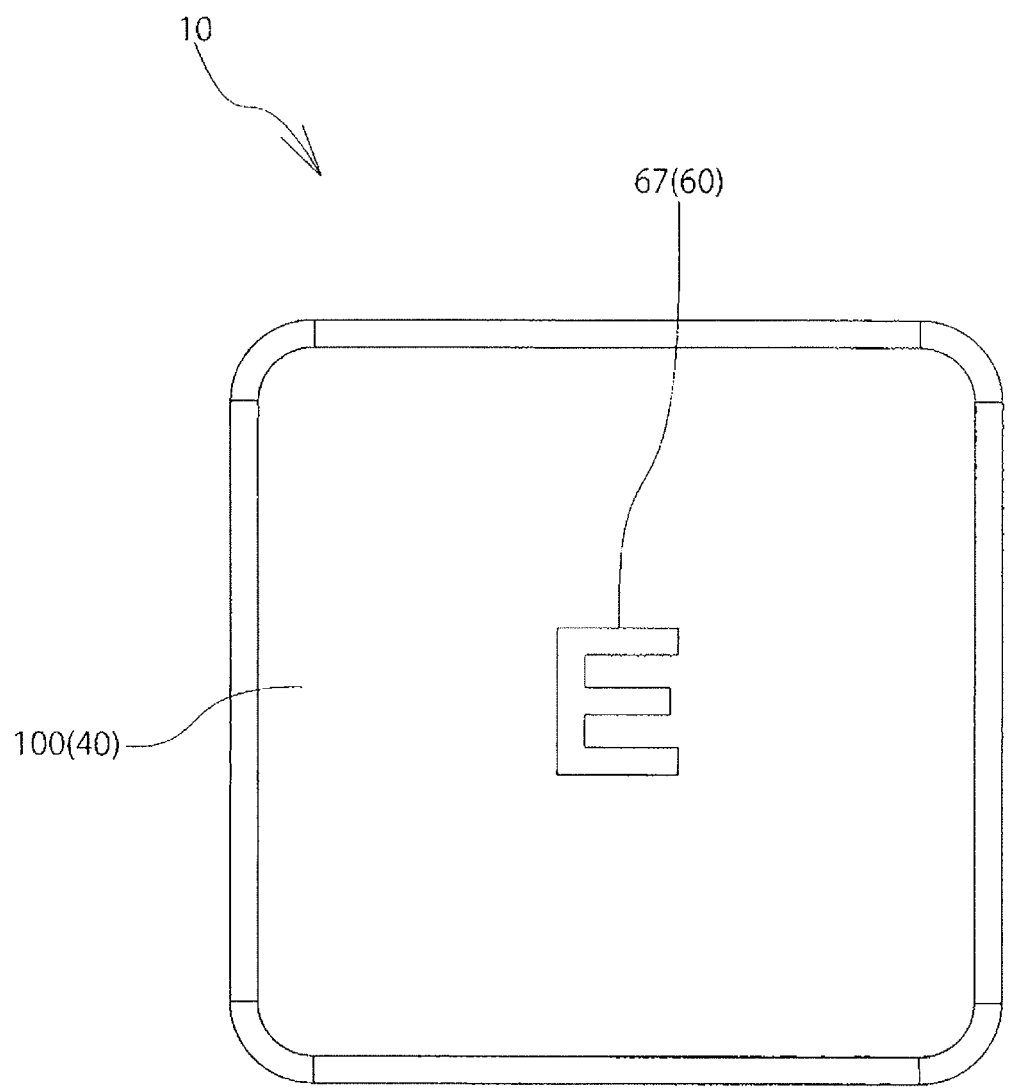
FIG. 4 is a plan view of the two-color molded article.

That is, the design face-side molded part 100 is molded by using molding material of the secondary side that is injected from a gate of a stationary-side die 200 to be described later and is filled between a cavity of the stationary-side die 200 and the design face of the primary-side base part 50, as illustrated in FIG. 1.

(2) Bottom face-side molded part 110

The bottom face-side molded part 110 turns in toward the bottom face side from the design face side of the primary-side base part 50 and covers the bottom face side of the primary-side base part 50, as illustrated in FIGS. 1, 3, 5, 6, and 7.

That is, the bottom face-side molded part 110 is molded using molding material of the secondary side that turns in toward the bottom face side from the design face side of the primary-side base part 50 and is filled between the cavity of the stationary die 200 to be described later and the bottom face of the primary-side base part 50, as illustrated in FIG. 1.

Also, the volume of the bottom face-side molded part 110 and the volume of the design face-side molded part 100 are set to an equal volume ratio between the two.

Specifically, for example, if it is assumed that the thickness of the two-color molded article 10 is "3.9 mm," then the thickness of the design face-side molded part 100 is set to "1.3 mm" and the thickness of the bottom face-side molded part 110 is set to "1.1 mm." The reason why the thickness of the design face-side molded part 100 is set thicker as compared with the thickness of the bottom face-side molded part 110 is because the primary-side decorative raised part 60 to be described later is formed on the design face side of the primary-side base part 50.

(3) Interspersed molded part (120)

Figure 5:
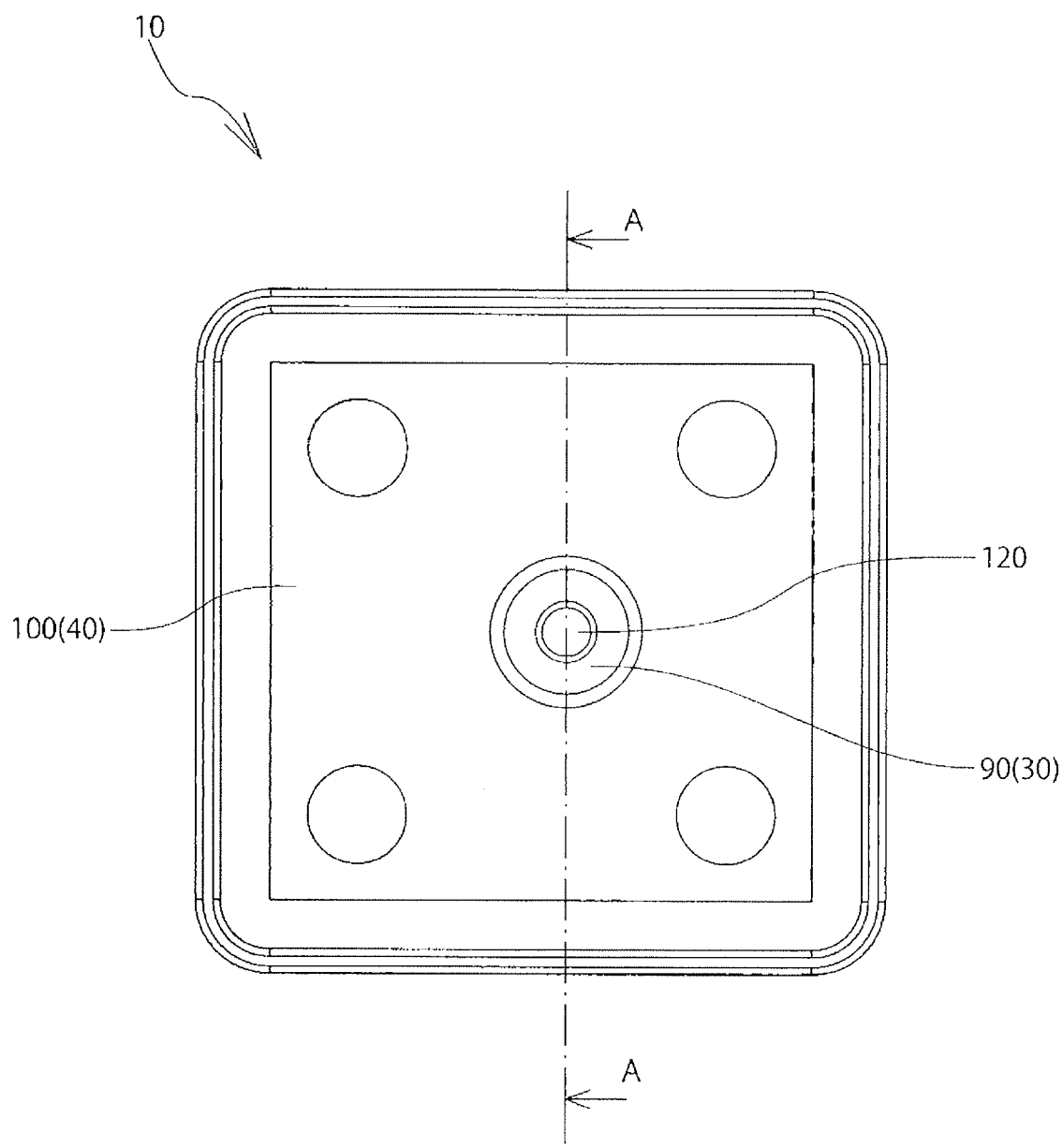
FIG. 5 is a bottom view of the two-color molded article.
Figure 6:
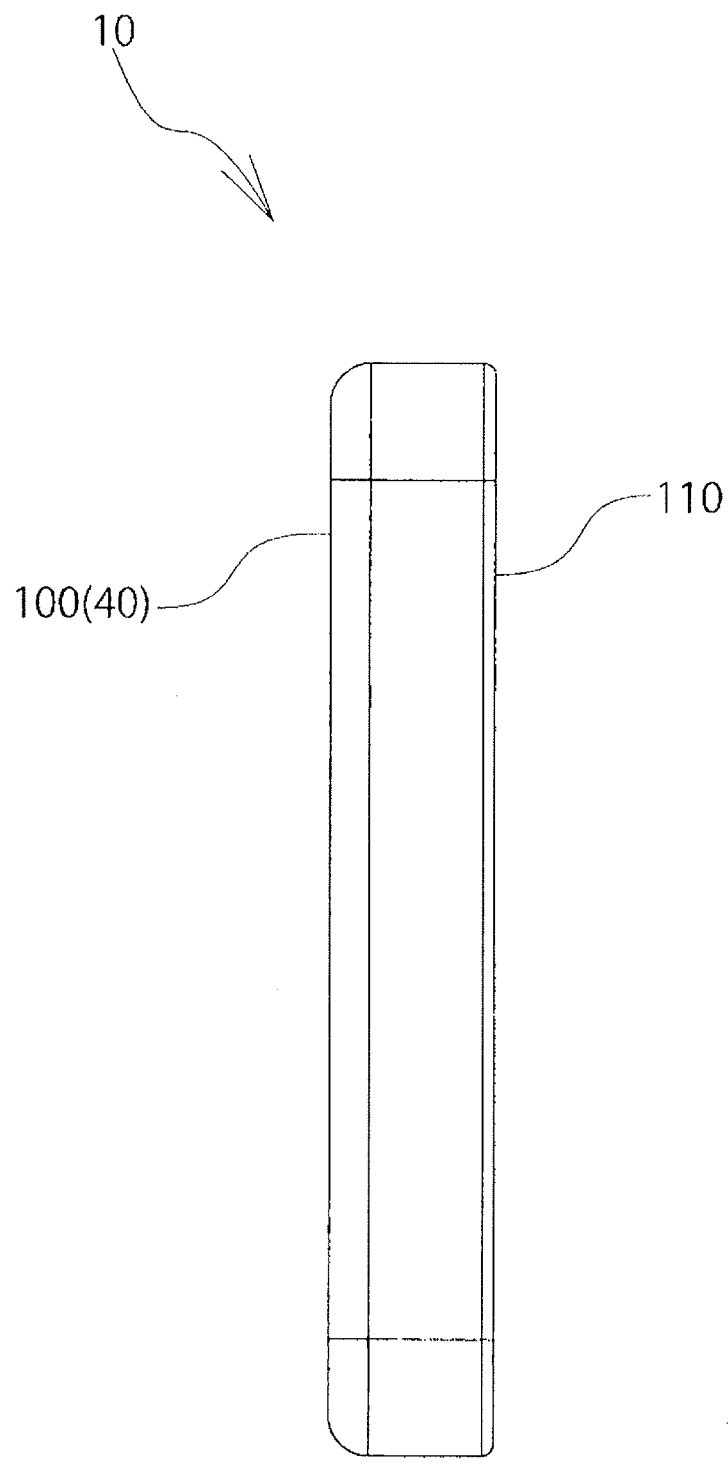
FIG. 6 is a side view of the two-color molded article.

The interspersed molded part 120 leads through the secondary-side resin flow paths 80 and 81 to be described later from the design face side to the bottom face side, and is interspersed at a distance from the bottom face-side molded part 110 with the protective wall 90 in between, as illustrated in FIGS. 1, 5, and 7.

That is, the interspersed molded part 120 is molded using molding material of the secondary side that flows through the secondary-side resin flow paths 80 and 81 to be described later from the design face side to the bottom face side and is filled inside the protective wall 90, as illustrated in FIG. 1.

(Primary-Side Base Part 50)

The primary-side base part 50 is formed in a plate form as illustrated in FIGS. 8 to 13. The primary-side base part 50 is held in sandwich form from the top and bottom faces between the design face-side molded part 100 and the bottom face-side molded part 110 and is embedded between these molded parts 100 and 110 during secondary molding, as illustrated in FIG. 1.

(Primary-Side Decorative Raised Part 60)

Figure 14:
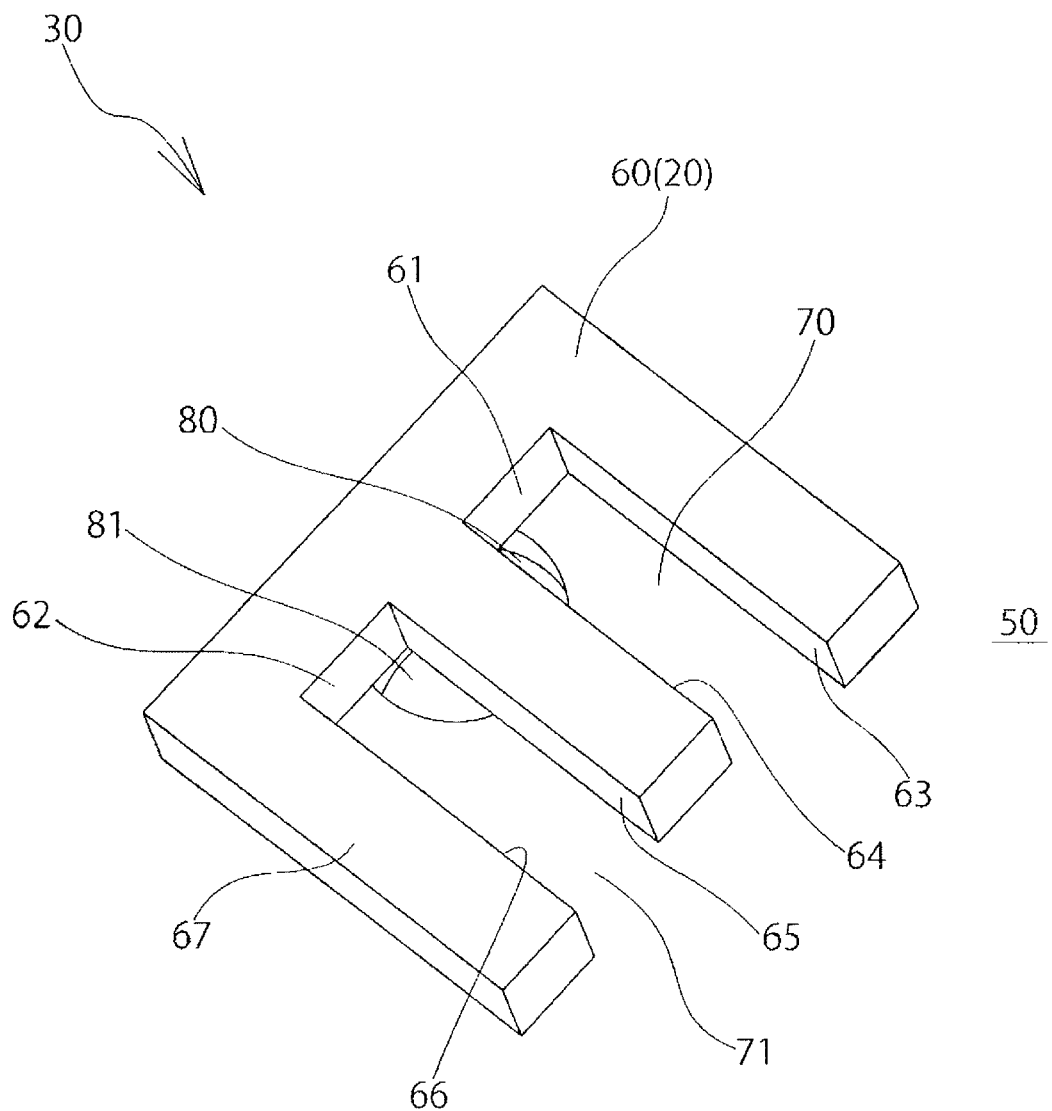
FIG. 14 is an enlarged view of the primary-side decorative raised part in FIG. 8.
Figure 15:
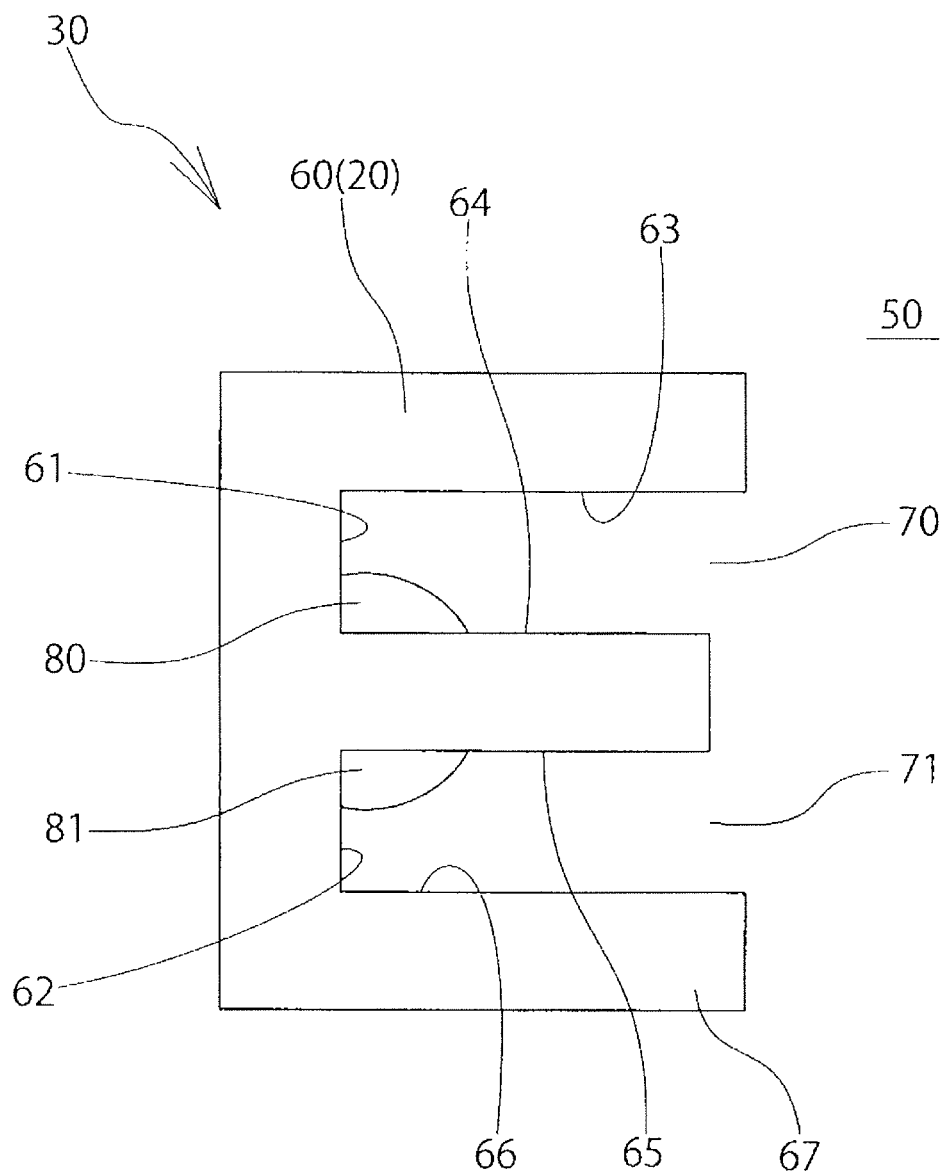
FIG. 15 is an enlarged view of the primary-side decorative raised part in FIG. 10.

The primary-side decorative raised part 60 projects from the design face side of the primary-side base part 50 and configures the decorative part 20 including the English letter "E," as illustrated in FIGS. 14 and 15.

Specifically, the primary-side decorative raised part 60 has the following faces, as illustrated in FIGS. 14 and 15.

The faces of the primary-side decorative raised part are not limited to the following (1) to (3).

(1) Upright faces 61 and 62

The upright faces 61 and 62 stand upright from the primary-side base part 50, as illustrated in FIGS. 14 and 15.

Specifically, the upright faces 61 and 62 are positioned on the outside face of the perimeter of the primary-side decorative raised part 60, and are embedded inside the design face-side molded part 100 during secondary molding.

Although the upright faces 61 and 62 were illustrated as two faces as an example, the invention is not limited to these, and the upright faces may be configured with one or three or more faces.

(2) Intersecting faces 63 to 66

The intersecting faces 63 to 66 intersect with the upright faces 61 and 62 and stand upright from the primary-side base part 50, as illustrated in FIGS. 14 and 15.

Also, the intersecting faces 63 to 66 intersect with the upright faces 61 and 62 at right angles or at acute angles.

Furthermore, the intersecting faces 63 to 66 are positioned on both sides of the upright faces 61 and 62.

Although the intersecting faces 63 to 66 were positioned on both sides of the upright faces 61 and 62, the invention is not limited to this, and the intersecting faces may be positioned on one side of the upright faces 61 and 62.

Specifically, the intersecting faces 63 to 66 are positioned on the outside face of the perimeter of the primary-side decorative raised part 60, and are embedded inside the design face-side molded part 100 during secondary molding, in the same manner as the upright faces 61 and 62 are.

Although the intersecting faces 63 to 66 were illustrated as four faces as an example, the invention is not limited to these, and the intersecting faces may be configured with one to three or five or more faces.

(3) Top layer face 67

The top layer face 67 is positioned on a top layer of the secondary-side molded article 40, that is, the upper face of the primary-side decorative raised part 60, as illustrated in FIGS. 14 and 15, and is exposed from the design face-side molded part 100 during secondary molding.

(Dead-End Parts 70 and 71)

The dead-end parts 70 and 71 are positioned on the primary-side base part 50, are at least surrounded by the upright faces 61 and 62 and the intersecting faces 63 to 66, and are positioned outside of the primary-side decorative raised part 60, as illustrated in FIGS. 14 and 15.

Although the dead-end parts 70 and 71 were illustrated as two parts as an example, the invention is not limited to these; for example there may be one or three or more dead-end parts in the case of a character, figure, or symbol other than the English letter "E."

(Secondary-Side Resin Flow Paths 80 and 81)

The secondary-side resin flow paths 80 and 81 are formed in the dead-end parts 70 and 71 and run through the primary-side base part 50 from the design face side to the bottom face side, as illustrated in FIGS. 9, 13, and 14 to 16.

Figure 16:
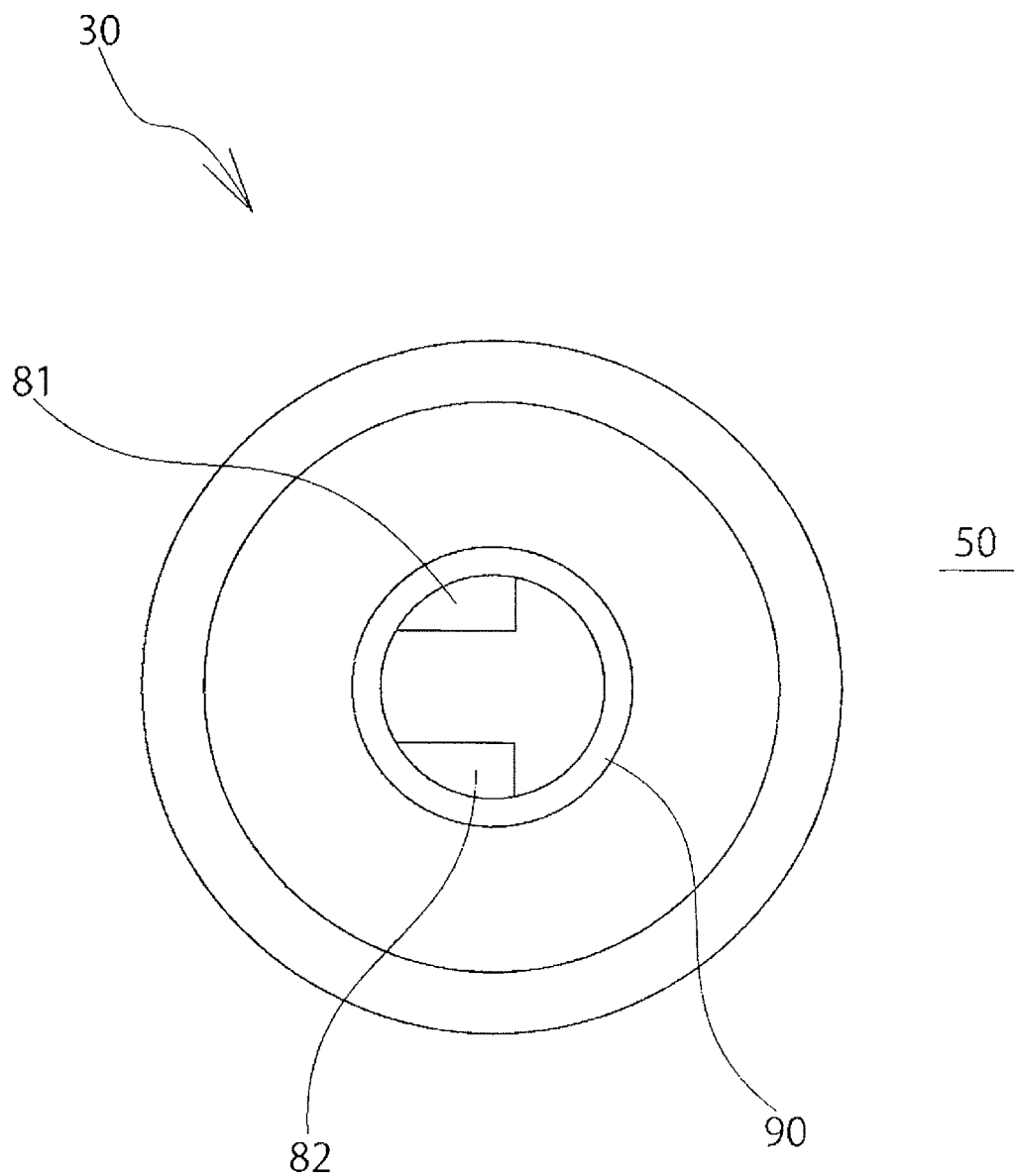
FIG. 16 is an enlarged view of the primary-side decorative raised part in FIG. 11.

Also, the secondary-side resin flow paths 80 and 81 face either the upright faces 61 and 62 or the intersecting faces 63 to 66, as illustrated in FIGS. 14 to 16.

That is, in the two secondary-side resin flow paths 80 and 81, the secondary-side resin flow path 80 faces two faces between the upright face 61 and the intersecting face 64, as illustrated in FIGS. 14 to 16.

Also, the secondary-side resin flow path 81 faces two faces between the upright face 62 and the intersecting face 65.

Although the secondary-side resin flow paths 80 and were arranged to face two faces, the invention is not limited to this, and the secondary-side resin flow paths may face one face or three or more faces.

Also, although the section of the secondary-side resin flow paths 80 and 81 was formed in a fan shape, the invention is not limited to this, and the section may be formed in a circular shape, oblong shape, elliptical shape, square shape, or geometric pattern shape.

(Protective Wall 90)

The protective wall 90 projects from the bottom face side of the primary-side base and surrounds the perimeter of the secondary-side resin flow paths 80 and 81, as illustrated in FIGS. 9, 13, and 14 to 16.

Also, the protective wall 90 is formed in a tube shape, for example, a cylindrical shape.

Although the protective wall 90 was illustrated as having a cylindrical shape as an example, the invention is not limited to this, and the protective wall may be formed in an angular tube shape.

Furthermore, the protective wall 90 is formed to straddle two or more adjacent secondary-side resin flow paths 80 and 81.

Although the protective wall 90 was formed to straddle two or more adjacent secondary-side resin flow paths 80 and 81, the invention is not limited to this, and a total of two protective walls may be formed independently to straddle two or more adjacent secondary-side resin flow paths 80 and 81.

(Production Process)

Figure 17:
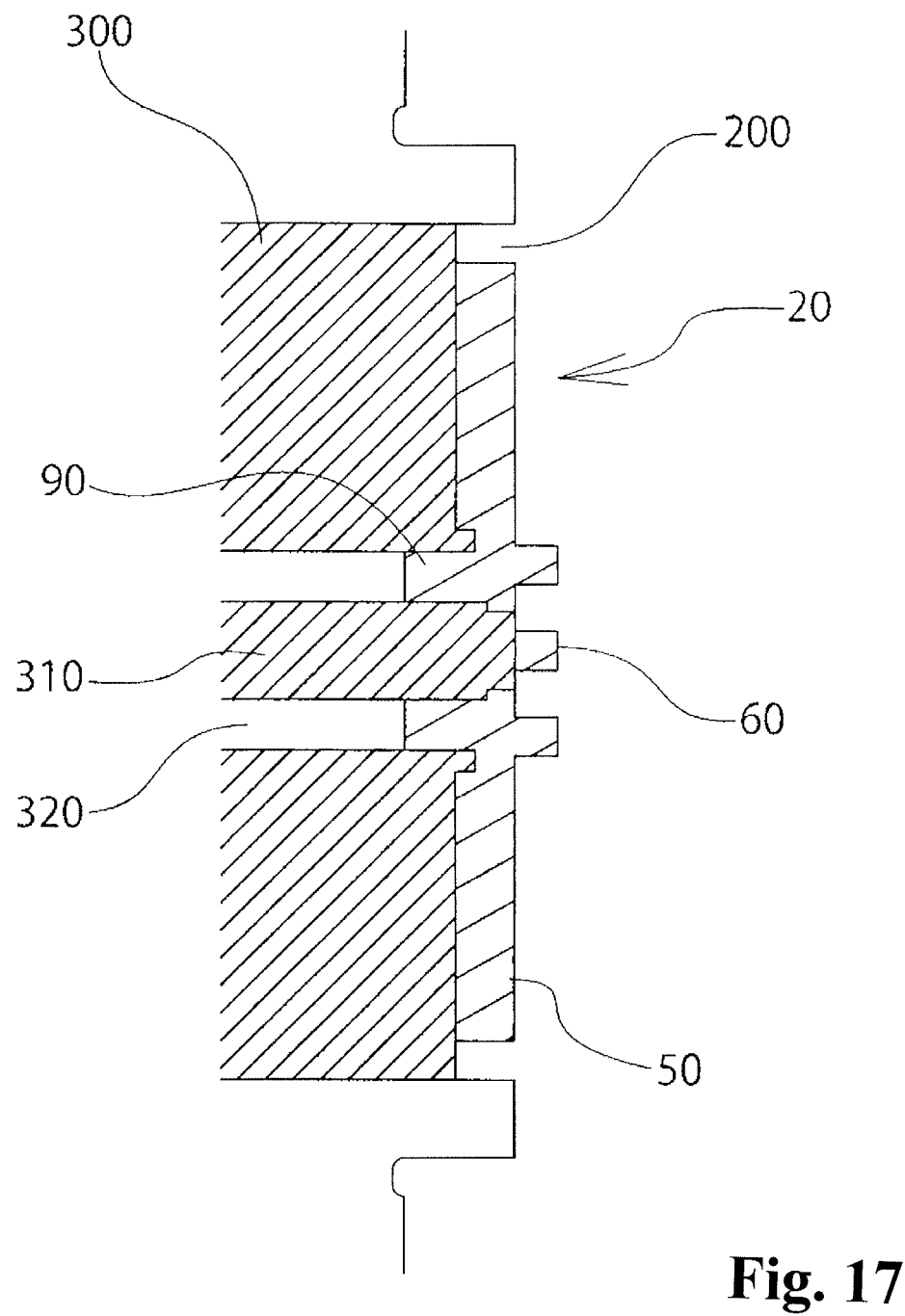
FIG. 17 is a schematic longitudinal sectional view of the dice during primary molding of the first embodiment of the present invention.

The process for production of the two-color molded article 10 is next described using FIG. 1 and FIG. 17.

Describing the dice first, the dice, largely divided, is configured with the following dice.

The following (1) and (2) are to be described.

(1) Stationary-side die 200

(2) Movable-side die 300

The dice are not limited to the above (1) and (2).

(Stationary-Side Die 200)

A cavity is formed on a top face of the stationary-side die 200, the cavity conforming to the shape of one half, that is, the design face side, of the primary-side molded article 30 and the secondary-side molded article 40, as illustrated in FIG. 17. Although not illustrated, a gate fronts on the cavity.

During primary molding, although not illustrated, a slide core is advanced into the cavity of the stationary-side die 200, and the primary-side decorative raised part 60 of the primary-side molded article 30 is molded.

(Movable-Side Die 300)

The movable-side die 300 is configured to be movable against the stationary-side die 200, and a cavity is formed, conforming to the shape of the other half, that is, the bottom face side, of the primary-side molded article 30 and the secondary-side molded article 40, as illustrated in FIGS. 1 and 17.

The movable-side die 300 has the following cores, as illustrated in FIG. 1.

The cores of the movable-side die 300 are not limited to the following (1) and (2).

(1) Slide core 310

The slide core 310 is supported to be capable of sliding on the movable-side die 300, and is inserted into the secondary-side resin flow paths 80 and 81 during primary molding, as illustrated in FIG. 1.

Also, the slide core 310 is retracted during retraction of the movable-side die 300, and secondary molding resin filled from the design face side of the primary-side base part 50 is allowed to flow to the bottom face side, as illustrated in FIG. 1.

Furthermore, the retracted slide core 310 is brought to a stop inside the secondary-side resin flow paths 80 and 81, as illustrated in FIG. 1.

Specifically, the amount of retraction of the slide core 310 is set smaller than the amount of retraction of the movable-side die 300.

(2) Primary-Side Deformation-Preventing Core 320

The primary-side deformation-preventing core 320 does not move during retraction of the movable-side die 300, and a state is maintained, in which the primary-side deformation-preventing core abuts against the end face of the top end part of the protective wall 90 of the primary-side molded article 30, as illustrated in FIG. 1. The shape of the protective wall 90 during secondary molding is maintained by the primary-side deformation-preventing core 320.

(Primary-Side Molding Process)

The primary-side molding process is next described using FIG. 17.

First, the stationary-side die 200 and the movable-side die 300 are closed, then molten resin for molding of the primary side is injected from the side of the stationary-side die 200, and the primary-side molded article 30 is primarily molded as illustrated in FIG. 17.

During primary molding, although not illustrated, the slide core 310 of the movable-side die 300 is advanced inside the cavity for molding the secondary-side resin flow paths 80 and 81.

(Secondary-Side Molding Process)

The secondary-side molding process is next described using FIG. 1.

After primary molding, the movable-side die 300 is retracted as illustrated in FIG. 1.

At this time, the slide core 310 is retracted together with the movable-side die 300 as illustrated in FIG. 1, but the amount of retraction at this time is set smaller than the amount of retraction of the movable-side die 300, so that the retracted slide core 310 is brought to a stop inside the secondary-side resin flow paths 80 and 81, as illustrated in FIG. 1.

Then, molten resin for molding of the secondary side is injected from the side of the stationary-side die 200, and a two-color molded article 10 is molded so that the perimeter of the primary-side molded article 30 is roughly covered by the secondary-side molded article 40, as illustrated in FIG. 1.

That is, the molten resin for molding of the secondary side, having been injected from the side of the stationary-side die 200, is filled inside the cavity of the stationary-side die 200, and the design face-side molded part 100 for covering the perimeter of the primary-side decorative raised part 60 is secondarily molded.

At the same time, the molten resin passes through a gap between the perimeter of the primary-side base part 50 and the cavity of the stationary-side die 200, and is filled between the bottom face of the primary-side base part 50 and the cavity of the retracted movable-side die 300, so that the bottom face-side molded part 110 is secondarily molded.

Meanwhile, during secondary molding of the design face-side molded part 100, the molten resin reaches the dead-end parts 70 and 71 on the perimeter of the primary-side decorative raised part 60, and is filled inside the protective wall 90 through the secondary-side resin flow paths 80 and 81.

At this time, the molten resin having passed through the secondary-side resin flow paths 80 and 81 is filled between the inner perimeter face of the protective wall 90 and the slide core 310 having stopped inside the protective wall 90.

During secondary molding, the molten resin having turned in toward the bottom face side past the perimeter of the primary-side base part 50 is blocked by the protective wall 90 and does not intersect with the molten resin having been filled inside the protective wall 90 through the secondary-side resin flow paths 80 and 81.

Therefore, the production of gas burns or weld lines, which are easily produced in the dead-end parts 70 and 71, can be prevented in advance.

Also, the primary-side molded article 30 and the secondary-side molded article 40 contract at different ratios after secondary molding. At this time, the perimeter of the primary-side base part 50 of the primary-side molded article 30 is surrounded by resin of the secondary-side molded article 40, and the volume of the design face-side molded part 100 and the volume of the bottom face-side molded part 110 are set to an equal volume ratio. Therefore, the contraction ratios can be made nearly equal in the top and bottom directions of the two-color molded article 10, and therefore, the occurrence of warping in the thickness direction of the two-color molded article 10 can be mitigated.

The entire contents of the specification, claims, drawings, and abstract of Japanese Patent Application No. 2010-022714, filed on Feb. 4, 2010, are incorporated by reference herein as a disclosure of the specification of the present invention.

What is claimed is:

1. A two-color molded article having a perimeter of a primary-side molded article roughly covered by a secondary-side molded article,
    wherein said primary-side molded article includes:
    a primary-side base part;
    a primary-side decorative raised part projecting from a design face side of said primary-side base part and configuring a character, figure, or other decorative part;
    an upright face standing upright from said primary-side base part;
    an intersecting face intersecting with said upright face and standing upright from said primary-side base part;
    a dead-end part on said primary-side base part, said dead-end part being at least surrounded by said upright face and said intersecting face and being positioned outside of the primary-side decorative raised part;
    a secondary-side resin flow path formed on said dead-end part and running through said primary-side base part from the design face side to a bottom face side; and
    a protective wall projecting from a bottom face side of said primary-side base part and surrounding a perimeter of said secondary-side resin flow path; and
    said secondary-side molded article includes:
    a design face-side molded part filled from the design face side of said primary-side base part and covering the perimeter of said primary-side decorative raised part;
    a bottom face-side molded part turning in toward the bottom face side from the design face side of said primary-side base part and covering the bottom face side of said primary-side base part; and
    an interspersed molded part flowing through said secondary-side resin flow path from the design face side to the bottom face side and being interspersed at a distance from said bottom face-side molded part with said protective wall in between.

2. The two-color molded article according to claim 1, wherein
    a volume of said design face-side molded part and a volume of said bottom face-side molded part are set to an equal volume ratio.

3. The two-color molded article according to claim 1, wherein said intersecting face intersects with said upright face at a right angle or at an acute angle.

4. The two-color molded article according to claim 1, wherein said intersecting face is positioned on two sides of said upright face; and
    said dead-end part is surrounded on three sides.

5. The two-color molded article according to claim 1, wherein said secondary-side resin flow path faces either said upright face or said intersecting face.

6. The two-color molded article according to claim 1, wherein said protective wall is formed in a cylindrical shape.

7. The two-color molded article according to claim 1, wherein said protective wall is formed to straddle two or more adjacent secondary-side resin flow paths.

8. A process for production of a two-color molded article having a perimeter of a primary-side molded article roughly covered by a secondary-side molded article, comprising:
   primarily molding said primary-side molded article, said primary-side molded article including:
   a primary-side base part;
   a primary-side decorative raised part projecting from a design face side of said primary-side base part and configuring a character, figure, or other decorative part;
   an upright face standing upright from said primary-side base part;
   an intersecting face intersecting with said upright face and standing upright from said primary-side base part;
   a dead-end part on said primary-side base part, said dead-end part being at least surrounded by said upright face and said intersecting face and being positioned outside of the primary-side decorative raised part;
   a secondary-side resin flow path formed on said dead-end part and running through said primary-side base part from the design face side to a bottom face side; and
   a protective wall projecting from a bottom face side of said primary-side base part and surrounding a perimeter of said secondary-side resin flow path,
   retracting a movable-side die in a direction of moving away from the bottom face side of said primary-side base, and thereby secondarily molding said secondary-side molded article, said secondary-side molded article including:
   a design face-side molded part filled from the design face side of said primary-side base part and covering the perimeter of said primary-side decorative raised part;
   a bottom face-side molded part turning in toward the bottom face side from the design face side of said primary-side base part and covering the bottom face side of said primary-side base part; and
   an interspersed molded part flowing through said secondary-side resin flow path from the design face side to the bottom face side and being interspersed at a distance from said bottom face-side molded part with said protective wall in between.

9. The process for production of a two-color molded article according to claim 8, wherein said movable-side die has a slide core to be inserted into said secondary-side resin flow path; and
   during retraction of said movable-side die, said slide core is retracted, whereby secondary molding resin filled from the design face side of said primary-side base part is allowed to flow to the bottom face side.

10. The process for production of a two-color molded article according to claim 8, wherein said movable-side die has a slide core to be inserted into said secondary-side resin flow path; and
   during retraction of said movable-side die, said slide core is retracted, and the retracted slide core is brought to a stop inside said secondary-side resin flow path.

* * * * *